(12) United States Patent
Tsuchiya

(10) Patent No.: US 12,351,054 B2
(45) Date of Patent: Jul. 8, 2025

(54) CHARGING FACILITY AND MANAGEMENT DEVICE OF CHARGING FACILITY

(71) Applicant: TOYOTA JIDOSHA KABUSHIKI KAISHA, Aichi-ken (JP)

(72) Inventor: Yoshiyuki Tsuchiya, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 613 days.

(21) Appl. No.: 17/829,251

(22) Filed: May 31, 2022

(65) Prior Publication Data

US 2022/0388412 A1 Dec. 8, 2022

(30) Foreign Application Priority Data

Jun. 2, 2021 (JP) .................................. 2021-092849

(51) Int. Cl.
*B60L 53/35* (2019.01)
*B60L 53/66* (2019.01)
*H02J 7/00* (2006.01)

(52) U.S. Cl.
CPC .............. *B60L 53/35* (2019.02); *B60L 53/66* (2019.02); *H02J 7/0042* (2013.01)

(58) Field of Classification Search
CPC ................................. B60L 53/35; B60L 53/66
USPC ....................................................... 320/109
See application file for complete search history.

(56) References Cited

U.S. PATENT DOCUMENTS

| 11,305,662 | B2* | 4/2022 | Freeling-Wilkinson ..................... B60L 53/30 |
| 11,479,135 | B2* | 10/2022 | Price .................... B60L 53/305 |
| 2012/0007554 | A1 | 1/2012 | Kanamori et al. |
| 2012/0286730 | A1* | 11/2012 | Bonny ..................... B60L 53/14 320/109 |
| 2013/0307477 | A1* | 11/2013 | Reinschke ............. B60L 53/30 320/109 |
| 2018/0043787 | A1* | 2/2018 | Shah ...................... B60L 53/305 |
| 2018/0056799 | A1* | 3/2018 | Namou ................... B60L 58/20 |
| 2021/0053456 | A1* | 2/2021 | Freeling-Wilkinson ..................... B60L 53/18 |

FOREIGN PATENT DOCUMENTS

| DE | 102011105421 A1 | 12/2012 |
| JP | 2011109807 A | 6/2011 |
| JP | 2012-019636 A | 1/2012 |
| JP | 5475407 B2 | 4/2014 |
| WO | 2019/073271 A1 | 4/2019 |

* cited by examiner

*Primary Examiner* — Nathaniel R Pelton
(74) *Attorney, Agent, or Firm* — HAUPTMAN HAM, LLP

(57) ABSTRACT

When a control device receives the charging request, the control device executes a process including a step of acquiring position information, a step of executing elevating control when a position of a vehicle is within a first distance and a speed of the vehicle is equal to or less than a threshold value, a step of acquiring position information when a non-charging state is established, and a step of executing lowering control when the vehicle is away by a second distance or more.

14 Claims, 9 Drawing Sheets

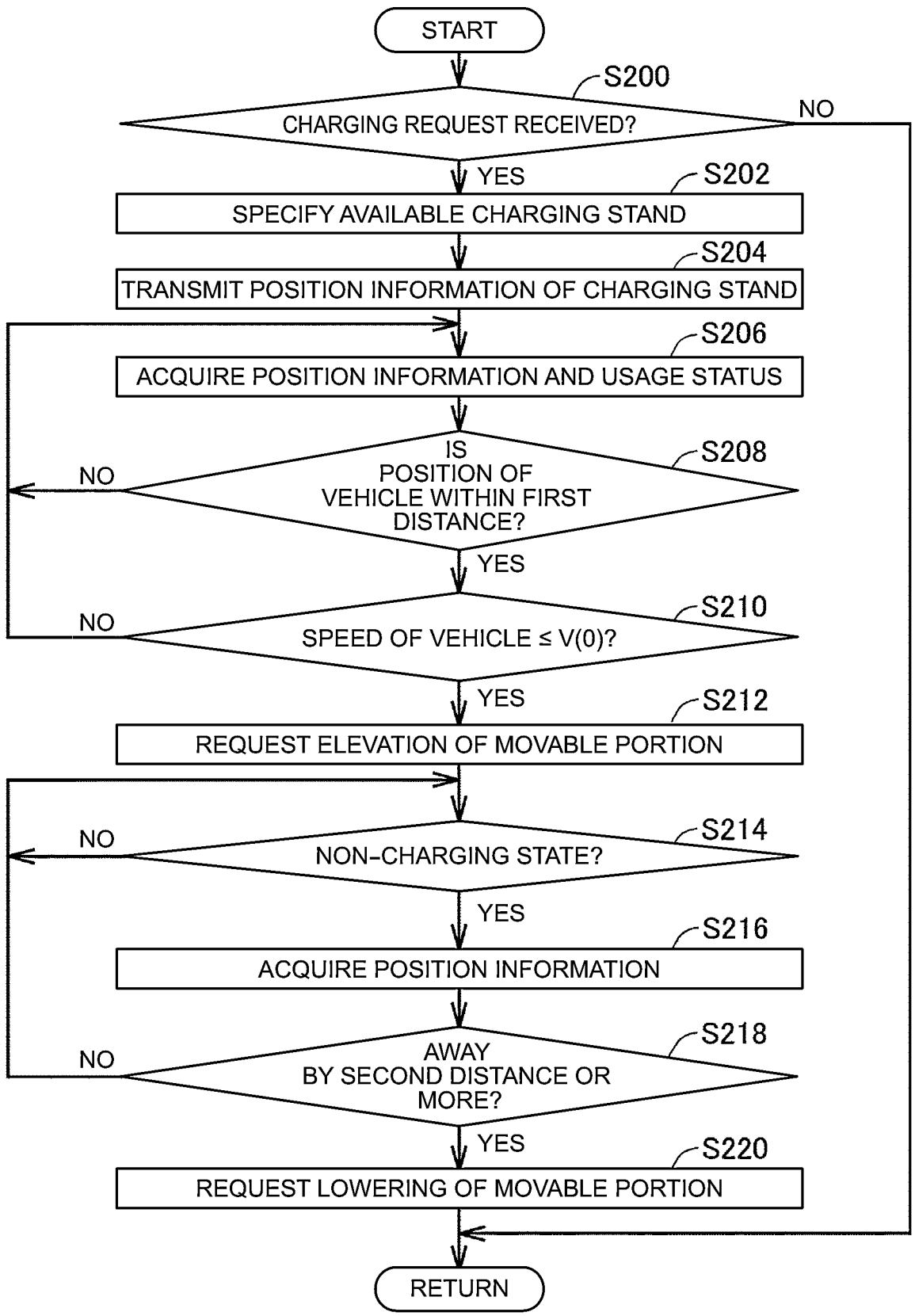

CHARGING FACILITY AND MANAGEMENT DEVICE OF CHARGING FACILITY

CROSS-REFERENCE TO RELATED APPLICATION

This application claims priority to Japanese Patent Application No. 2021-092849 filed on Jun. 2, 2021, incorporated herein by reference in its entirety.

BACKGROUND

1. Technical Field

The present disclosure relates to control of a movable charging facility for charging a power storage device mounted on a vehicle.

2. Description of Related Art

A charging facility for charging a power storage device mounted on a vehicle or the like is installed in the parking lot or sidewalk outside the vehicle. However, the charging facility occupies the installation space, and therefore may interfere with walking or traveling of the vehicle. Therefore, a technique for making the charging facility movable and storing the charging facility underground, for example, is known.

For example, Japanese Unexamined Patent Application Publication No. 2011-109807 (JP 2011-109807 A) discloses a charging pole that can be elevated to be upright from the ground and can be lowered so as to be stored underground.

SUMMARY

However, when the movable charging facility that can be elevated and lowered as described above is stored underground, it takes time for a user who is driving the vehicle and intends to use the charging facility to elevate the charging facility to be upright on the ground and also takes time for the user to use the charging facility. Therefore, there is a possibility that the convenience of the charging facility is impaired. On the other hand, when the charging facility is kept upright on the ground at all times, there is a possibility that the landscape of the place where the charging facility is installed is spoiled.

The present disclosure has been made to solve the above-mentioned issue, and an object thereof is to provide a charging facility and a management device of the charging facility that suppress deterioration of convenience without spoiling the landscape of the installation place.

A charging facility according to an aspect of the present disclosure is a movable charging facility that is installed in a recess provided on a ground and is able to charge a power storage device mounted on a vehicle. The charging facility includes: a movable portion including a connecting device that is connectable to the power storage device; an elevating device that elevates and lowers the movable portion such that any of a plurality of states is established, the states including a first state in which the movable portion is stored underground and a second state in which the movable portion is exposed on the ground; a communication device that is communicable with an external device of the charging facility including the vehicle; and a control device that controls the elevating device using information received via the communication device. The control device acquires a position of a target vehicle to be charged using the communication device, and controls the elevating device such that the movable portion is elevated when the acquired position is a position within a first distance from the charging facility and a speed of the target vehicle is equal to or less than a threshold value indicating a stopped state or a slow-moving state.

With this process, when the position of the target vehicle is within the first distance from the charging facility and the target vehicle is in the stopped state or the slow-moving state, the movable portion can be elevated without the operation by the user to elevate the movable portion. Further, it is possible to suppress elevation of the movable portion until the target vehicle is stopped or slowed down at a position within the first distance from the charging facility. Therefore, it is possible to suppress deterioration of the convenience of the charging facility while suppressing the landscape of the place where the charging facility is installed from being spoiled.

In an embodiment, the control device controls the elevating device such that the movable portion is lowered when the target vehicle is away from the charging facility by a second distance or more after the elevating device is elevated. The second distance is longer than the first distance.

With this configuration, for example, the movable portion can be lowered without the operation by the user to lower the movable portion when the target vehicle is away from the charging facility by the second distance or more after the charging facility is used.

Further in an embodiment, the control device sets the first distance using at least one of a usage status of the charging facility and information on an area including an installation point of the charging facility.

With this configuration, the first distance is set using the usage status of the charging facility (for example, the frequency of use) or the information on the area including the installation point (for example, information related to the use area such as a residential area or a commercial area). Therefore, it is possible to suppress the deterioration of the convenience of the charging facility while suppressing the landscape of the place where the charging facility is installed from being spoiled.

A management device of a charging facility according to another aspect of the present disclosure is a management device that manages an operation of a plurality of movable charging facilities. The charging facilities are installed in respective recesses provided on a ground and are able to charge a power storage device mounted on a vehicle. The charging facilities each include a movable portion including a connecting device that is connectable to the power storage device, and an elevating device that elevates and lowers the movable portion such that any of a plurality of states is established, the states including a first state in which the movable portion is stored underground and a second state in which the movable portion is exposed on the ground, a communication device that is communicable with the management device, and a control device that controls the elevating device using information received via the communication device. The management device acquires a position of a target vehicle to be charged by a target charging facility that is any one of the charging facilities, and requests the target charging facility to elevate the movable portion when the acquired position is within a first distance from the target charging facility and a speed of the target vehicle is equal to or less than a threshold value indicating a stopped state or a slow-moving state.

With this process, when the position of the target vehicle is within the first distance from the charging facility and the target vehicle is in a stopped state or a slow-moving state, elevation of the movable portion is requested. Therefore, the movable portion can be elevated without the operation by the user to elevate the movable portion. Further, it is possible to suppress elevation of the movable portion until the target vehicle is stopped or slowed down at a position within the first distance from the charging facility. Therefore, it is possible to suppress deterioration of the convenience of the charging facility while suppressing the landscape of the place where the charging facility is installed from being spoiled.

In an embodiment, the management device requests the target charging facility to lower the movable portion when the target vehicle is away from the target charging facility by a second distance or more after the elevating device is elevated. The second distance is longer than the first distance.

With this configuration, for example, the movable portion can be lowered without the operation by the user to lower the movable portion when the target vehicle is away from the charging facility by the second distance or more after the charging facility is used.

Further in an embodiment, the management device sets the first distance using at least one of a usage status of the charging facility and information on an area including an installation point of the charging facility.

With this configuration, the first distance is set using the usage status of the charging facility (for example, the frequency of use) or the information on the area including the installation point (for example, information related to the use area such as a residential area or a commercial area). Therefore, it is possible to suppress the deterioration of the convenience of the charging facility while suppressing the landscape of the place where the charging facility is installed from being spoiled.

According to the present disclosure, it is possible to provide the charging facility and the management device of the charging facility that suppress deterioration of convenience without spoiling the landscape.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 9 is a flowchart showing an example of a process executed by a management server in a modification.

DETAILED DESCRIPTION OF EMBODIMENTS

Figure 1:
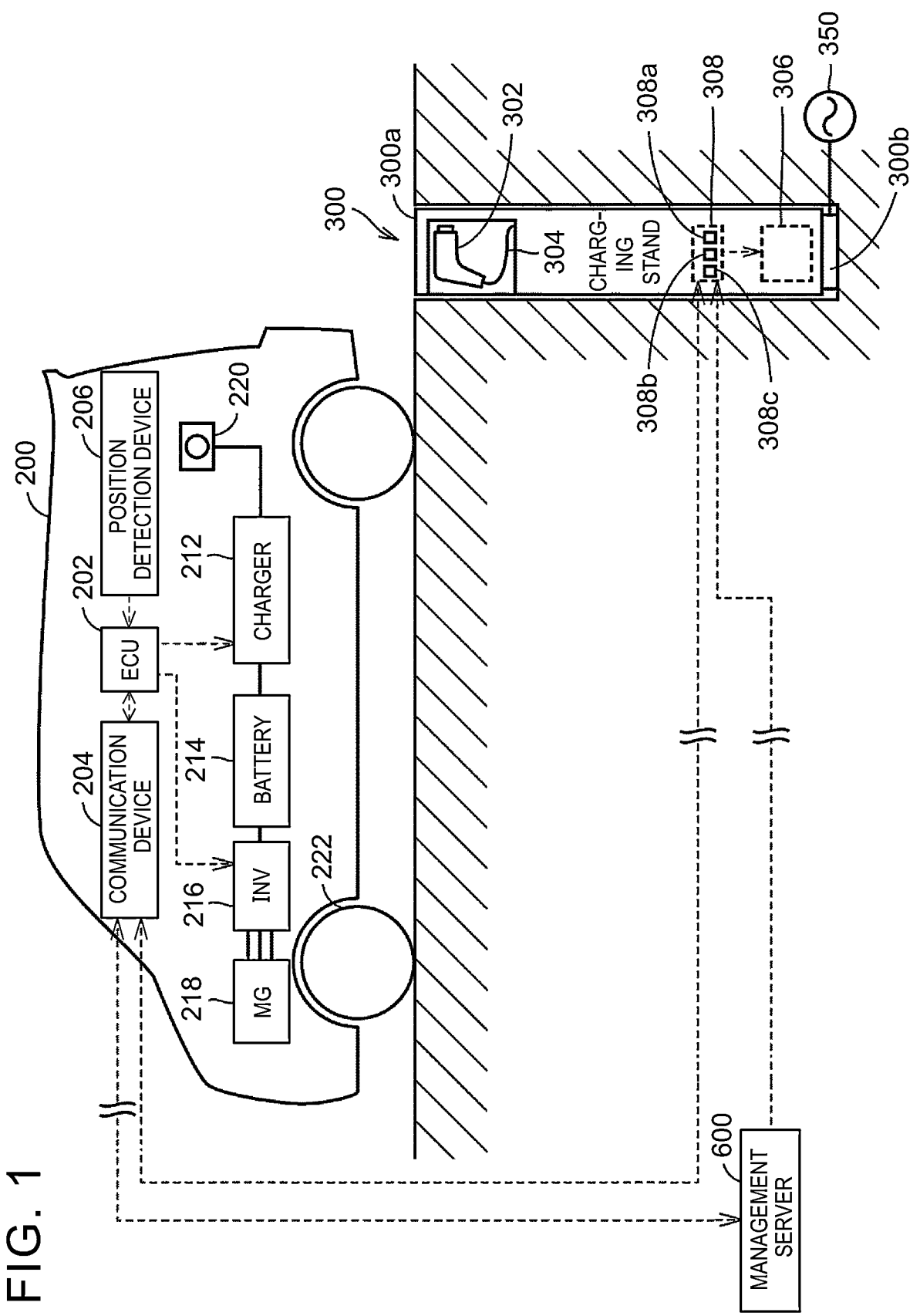
FIG. 1 is a diagram showing an example of a configuration of an electrified vehicle and a charging stand in a state where a movable portion is stored underground.

Hereinafter, an embodiment of the present disclosure will be described in detail with reference to the drawings. In the drawings, the same or corresponding portions are denoted by the same reference signs and the description thereof will not be repeated.

Figure 2:
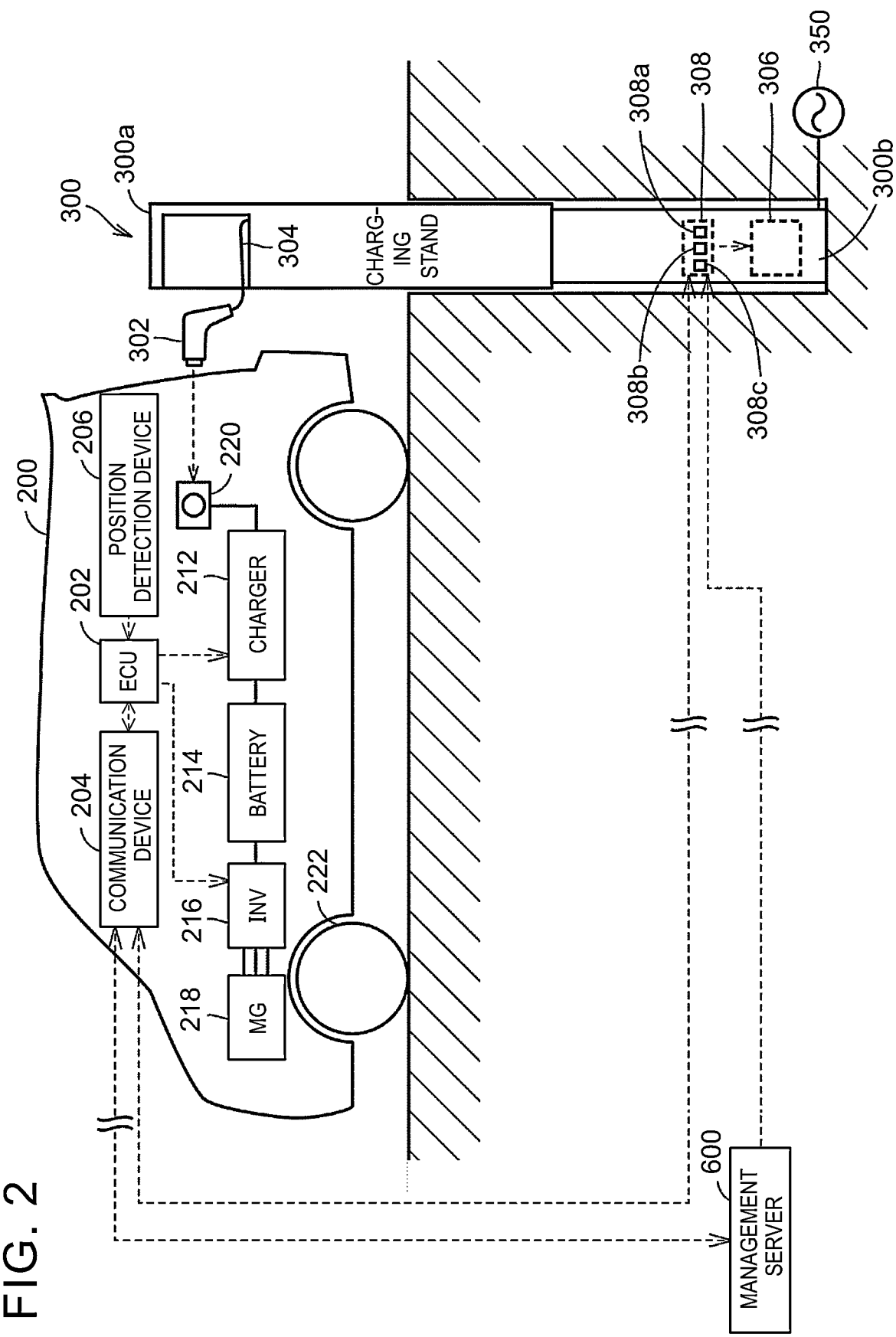
FIG. 2 is a diagram showing an example of the configuration of the electrified vehicle and the charging stand in a state where the movable portion is exposed on the ground.

Hereinafter, a configuration of a charging stand 300 that is a charging facility according to the embodiment of the present disclosure will be described as an example. FIG. 1 is a diagram showing an example of a configuration of an electrified vehicle 200 and the charging stand 300 in a state where a movable portion 300a (that will be described later) is stored underground. FIG. 2 is a diagram showing an example of the configuration of the electrified vehicle 200 and the charging stand 300 in a state where the movable portion 300a is exposed on the ground.

As shown in FIGS. 1 and 2, an upper end of the charging stand 300 is substantially flush with the ground. The charging stand 300 is configured such that the charging stand 300 can be elevated and lowered between a first state (see FIG. 1) in which the movable portion 300a is stored underground and a second state (see FIG. 2) in which the upper end is elevated to a predetermined position on the ground and the movable portion 300a is exposed on the ground.

The charging stand 300 includes, for example, a cylindrical housing and is installed on the bottom surface of a recess provided on the ground. The recess on the ground is provided so as to have a predetermined gap with an outer peripheral surface of the housing of the charging stand 300 and such that the depth is about the same as the vertical length of the charging stand 300 in the first state.

The charging stand 300 includes the movable portion 300a and a fixing portion 300b. A storage space capable of storing a connector 302 is provided in the upper portion of the movable portion 300a. One end of a cable 304 is connected to the connector 302, and the other end of the cable 304 is connected to a power source 350. The power source 350 is, for example, an alternate power (AC) power source configured by a commercial power source or the like. The cable 304 includes, for example, a shape extensible portion provided with a curl portion or a structural extensible portion provided with a reeling structure. The cable 304 is configured to be extensible to an inlet 220 of the electrified vehicle 200 parked in the parking space when the connector 302 is taken out.

The fixing portion 300b is fixed to the bottom surface of the recess provided on the ground. Note that, the fixing portion 300b is not particularly limited to being fixed to the bottom surface of the recess, as long as the fixing portion 300b is fixed to any portion in the recess provided on the ground.

The fixing portion 300b includes an elevating device 306 that elevates and lowers the movable portion 300a in an up-down direction, and a control device 308 that controls the operation of the elevating device 306.

The elevating device 306 includes an actuator for elevating and lowering the movable portion 300a. The elevating device 306 may include, for example, a rack and pinion type mechanism that elevates and lowers the movable portion 300a by rotating a pinion gear meshed with a rack gear fixed to the movable portion 300a using an electric actuator, may include a mechanism using a hydraulic cylinder that elevates and lowers the movable portion 300*a* by fixing a rod connected to a piston to the movable portion 300*a* and increasing or decreasing the hydraulic pressure supplied to a cylinder body fixed to the fixing portion 300*b*, or may include a mechanism that elevates and lowers the movable portion 300*a* by generating a repulsive force caused by a magnetic force between the movable portion 300*a* and the fixing portion 300*b*.

The elevating device 306 is configured such that the movable portion 300*a* is not lowered beyond the position corresponding to the first state by, for example, a stopper mechanism or the like, and is not elevated beyond the position corresponding to the second state.

The control device 308 includes a central processing unit (CPU) 308*a*, a memory 308*b* composed of a read only memory (ROM), a random access memory (ROM), and the like, and a communication unit 308*c* capable of communicating with an external device. The control device 308 controls an electric device (for example, the elevating device 306) provided in the charging stand 300 based on information stored in the memory 308*b*, information received via the communication unit 308*c*, and information acquired from other sensors (not shown). Note that, the controls above are not limited to the configuration in which the process executed by the software is executed by the CPU 300*a*, and the configuration may be constructed by the dedicated hardware (electronic circuit).

The communication unit 308*c* is configured to be capable of communicating various types of information and the like with an external device of the charging stand 300. FIGS. 1 and 2 show, as an example, that the communication device 204, the communication unit 308*c*, and the management server 600 are communicable with each other.

The communication unit 308*c* may be configured to be communicable with the management server 600 by, for example, wired communication. Further, the communication unit 308*c* may be configured to be communicable with the communication device 204 and the management server 600 by, for example, wireless communication. Note that, the communication unit 308*c* may be built in the control device 308 or may be provided separately from the control device 308.

For example, when an execution condition of elevating control is satisfied, the control device 308 executes the elevating control on the elevating device 306 such that the charging stand 300 is switched from the first state to the second state. The execution condition of the elevating control includes, for example, a condition that the charging stand 300 is in the first state and a condition that an execution request of the elevating control in the charging stand 300 (hereinafter may be referred to as an elevating request) is made. For example, the control device 308 may receive information indicating the elevating request from a mobile terminal (not shown) possessed by a user who performs charging using the charging stand 300, or may determine whether the elevating request is made based on information from the external device.

For example, when an execution condition of lowering control is satisfied, the control device 308 executes the lowering control on the elevating device 306 such that the charging stand 300 is switched from the second state to the first state. For example, the execution condition of the lowering control includes a condition that the charging stand 300 is in the second state and a condition that an execution request of the lowering control in the charging stand 300 (hereinafter referred to as a lowering request) is made. For example, the control device 308 may receive information indicating the lowering request from the mobile terminal, or may determine whether the lowering request is made based on information from the external device.

The management server 600 includes a control device, a communication device, and a storage device (none of which are shown). The control device of the management server 600 is composed of a CPU, a memory, and the like. The communication device of the management server 600 is communicably connected to the charging stand 300 or other devices such as a mobile terminal via a communication network or directly. The storage device of the management server 600 stores predetermined information. The control device of the management server 600 receives the predetermined information from the electrified vehicle 200 and the charging stand 300 via the communication device, and stores a part or all of the received information in the storage device.

FIGS. 1 and 2 further show an example of the configuration of the electrified vehicle 200 parked in a parking space where the electrified vehicle 200 can be charged by the charging stand 300. As shown in FIGS. 1 and 2, the electrified vehicle 200 includes, for example, a vehicle equipped with a power storage device such as a plug-in hybrid electric vehicle and a battery electric vehicle. Note that, the configuration of the electrified vehicle 200 is not limited to the vehicles listed above, as long as the electrified vehicle 200 has a configuration capable of receiving supply of electric power from the charging stand 300, and the electrified vehicle 200 is not particularly limited to the vehicles listed above. For example, the electrified vehicle 200 may be a vehicle equipped with a power storage device for external power supply.

The electrified vehicle 200 includes an electronic control unit (ECU) 202, the communication device 204, a position detection device 206, a charger 212, a battery 214, an inverter 216, a motor generator 218, and the inlet 220.

The ECU 202 includes a CPU and a memory composed of a ROM, RAM, and the like. The ECU 202 controls an electric device (for example, the communication device 204, the charger 212, or the inverter 216) provided in the electrified vehicle 200 based on information stored in the memory and information acquired from the sensors (for example, the position detection device 206 that will be described later).

The communication device 204 is configured to be capable of communicating various types of information and the like with an external device of the electrified vehicle 200. The communication device 204 is configured to be communicable with, for example, the management server 600 and also communicable with the charging stand 300. Note that, the communication device 204 may be configured to be communicable with the mobile terminal.

For example, the position detection device 206 acquires the current location of the electrified vehicle 200 based on a signal (radio wave) from a global positioning system (GPS) satellite, and outputs a signal indicating the current location of the electrified vehicle 200 to the ECU 202. Note that, a method for acquiring the current location of the electrified vehicle 200 may be a method for acquiring the current location using a satellite or the like capable of detecting the position other than a GPS satellite, or a method for acquiring the current location by exchanging predetermined information with a mobile base station or an access point of wireless local area network (LAN).

When the AC power is supplied from the inlet 220, the charger 212 converts the supplied AC power into direct current (DC) power and supplies the converted DC power to the battery 214. The battery 214 is charged by operating the charger 212. The charger 212 is controlled by, for example, a control signal from the ECU 202.

The battery 214 is, for example, a rechargeable energy storage element, typically a secondary battery such as a nickel metal hydride battery or a lithium ion battery containing a liquid or solid electrolyte. Alternatively, the battery 214 may be any power storage device capable of storing electric power, and for example, a large-capacity capacitor may be used instead of the battery 214.

The inverter 216 converts, for example, the DC power of the battery 214 into the AC power and supplies the converted AC power to the motor generator 218. Further, the inverter 216 converts, for example, the AC power (regenerative power) from the motor generator 218 into the DC power and supplies the converted DC power to the battery 214 to charge the battery 214.

The motor generator 218 receives electric power from the inverter 216 and applies a rotational force to drive wheels 222. The drive wheels 222 are each rotated by a rotational force applied by the motor generator 218 to drive the electrified vehicle 200.

The inlet 220 is provided on the exterior portion of the electrified vehicle 200 together with a cover (not shown) such as a lid. The inlet 220 is a power receiving unit that receives charging power from an external charging facility (for example, the charging stand 300). The inlet 220 has a shape to which the connector 302 of the charging stand 300 can be attached. A contact is included in each of the inlet 220 and the connector 302. When the connector 302 is attached to the inlet 220, the contacts come into contact with each other, and the inlet 220 and the connector 302 are electrically connected. At this time, the battery 214 of the electrified vehicle 200 is in a state where the battery 214 can be charged using the electric power supplied from the charging stand 300.

Figure 3:
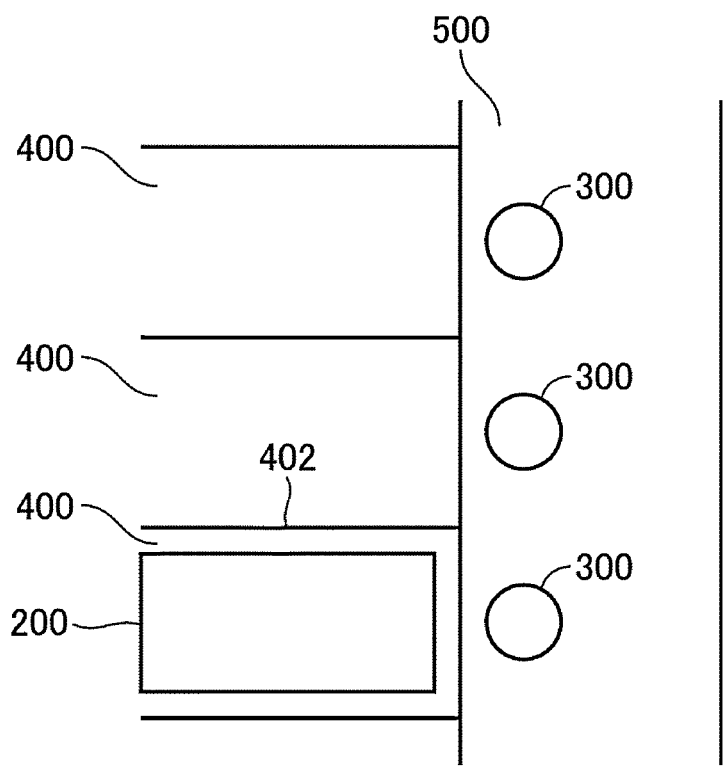
FIG. 3 is a diagram showing an example of the layout of the charging stands and parking spaces.

The charging stand 300 may be installed on a sidewalk adjacent to a plurality of parking spaces in a parking lot, a sidewalk adjacent to a plurality of parking spaces set on a road, or the like. FIG. 3 is a diagram showing an example of the layout of the charging stands 300 and parking spaces 400. As shown in FIG. 3, when the parking spaces 400 are set side by side by partition lines 402 in the parking lot, the charging stand 300 is installed at a position adjacent to each parking space 400. FIG. 3 shows, as an example, a configuration in which a sidewalk 500 is provided at one ends of the parking spaces 400 in the longitudinal direction (on the right side in FIG. 3). In this case, the charging stands 300 are installed along the sidewalk 500. When the electrified vehicle 200 is parked in any of the parking spaces 400 and the charging stand 300 is in the second state, the user takes out the connector 302 from the charging stand 300 and connects the connector 302 to the inlet 220 of the electrified vehicle 200.

Figure 4:
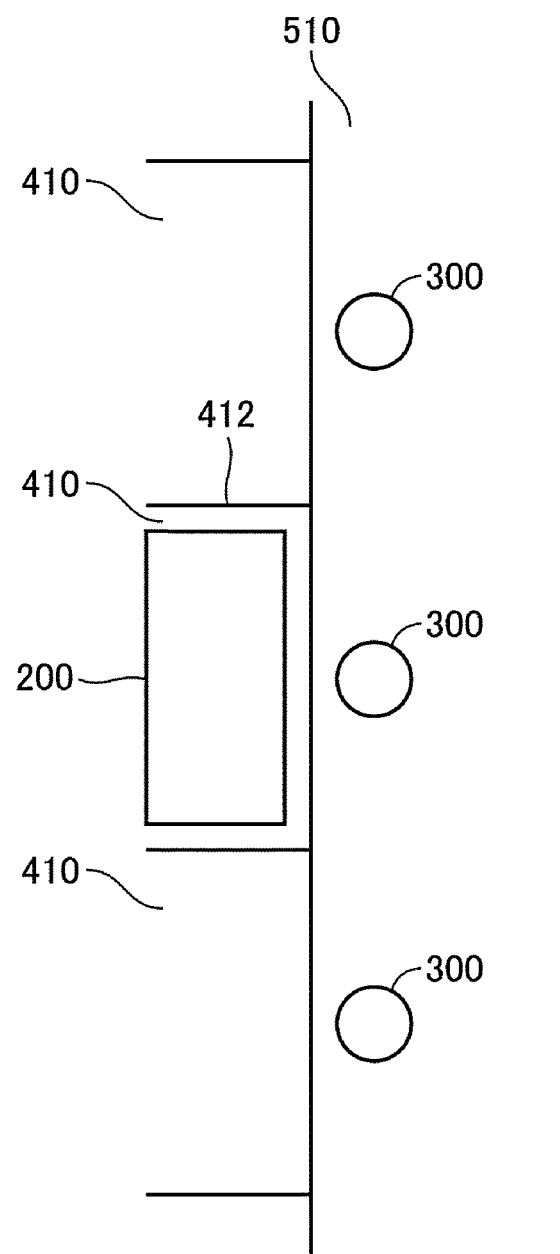
FIG. 4 is a diagram showing an example of the layout of the charging stands and the parking spaces.

FIG. 4 is a diagram showing an example of the layout of the charging stands 300 and parking spaces 410. As shown in FIG. 4, when the parking spaces 410 are set side by side by partition lines 412 in the parking lot, the charging stand 300 is installed at a position adjacent to each parking space 410. FIG. 4 shows, as an example, a configuration in which the parking spaces 410 are set along a sidewalk 510. In this case, the charging stands 300 will be installed along the sidewalk 510. When the electrified vehicle 200 is parked in any of the parking spaces 410 and the charging stand 300 is in the second state, the user takes out the connector 302 from the nearest charging stand 300 and connects the connector 302 to the inlet 220 of the electrified vehicle 200.

When the movable charging stand 300 that can be elevated and lowered as described above is in the first state in which the charging stand 300 is stored underground, it takes time for the user who is driving the electrified vehicle 200 and intends to use the charging stand 300 to place the charging stand 300 to be used in the second state in which the charging stand 300 is upright on the ground, and also takes time for the user to use the charging stand 300. Therefore, there is a possibility that the convenience of the charging stand 300 is impaired. On the other hand, when the charging stand 300 is kept in the second state in which the charging stand 300 is upright on the ground at all times, there is a possibility that the landscape of the place where the charging stand 300 is installed is spoiled.

Therefore, in the present embodiment, the control device 308 of the charging stand 300 acquires the position of the target vehicle to be charged, and controls the elevating device 306 such that the movable portion 300a is elevated when the acquired position is within a first distance from the charging stand 300, and the speed of the target vehicle is equal to or less than a threshold value indicating a stopped state or a slow-moving state.

With this process, when the position of the target vehicle is within the first distance from the charging stand 300 and the target vehicle is in the stopped state or the slow-moving state, the movable portion 300a can be elevated without an operation by the user to elevate the movable portion 300a. Further, it is possible to suppress elevation of the movable portion 300a until the target vehicle is stopped or slowed down at a position within the first distance from the charging stand 300. Therefore, it is possible to suppress deterioration of the convenience of the charging stand 300 while suppressing the landscape of the place where the charging facility is installed from being spoiled.

Figure 5:
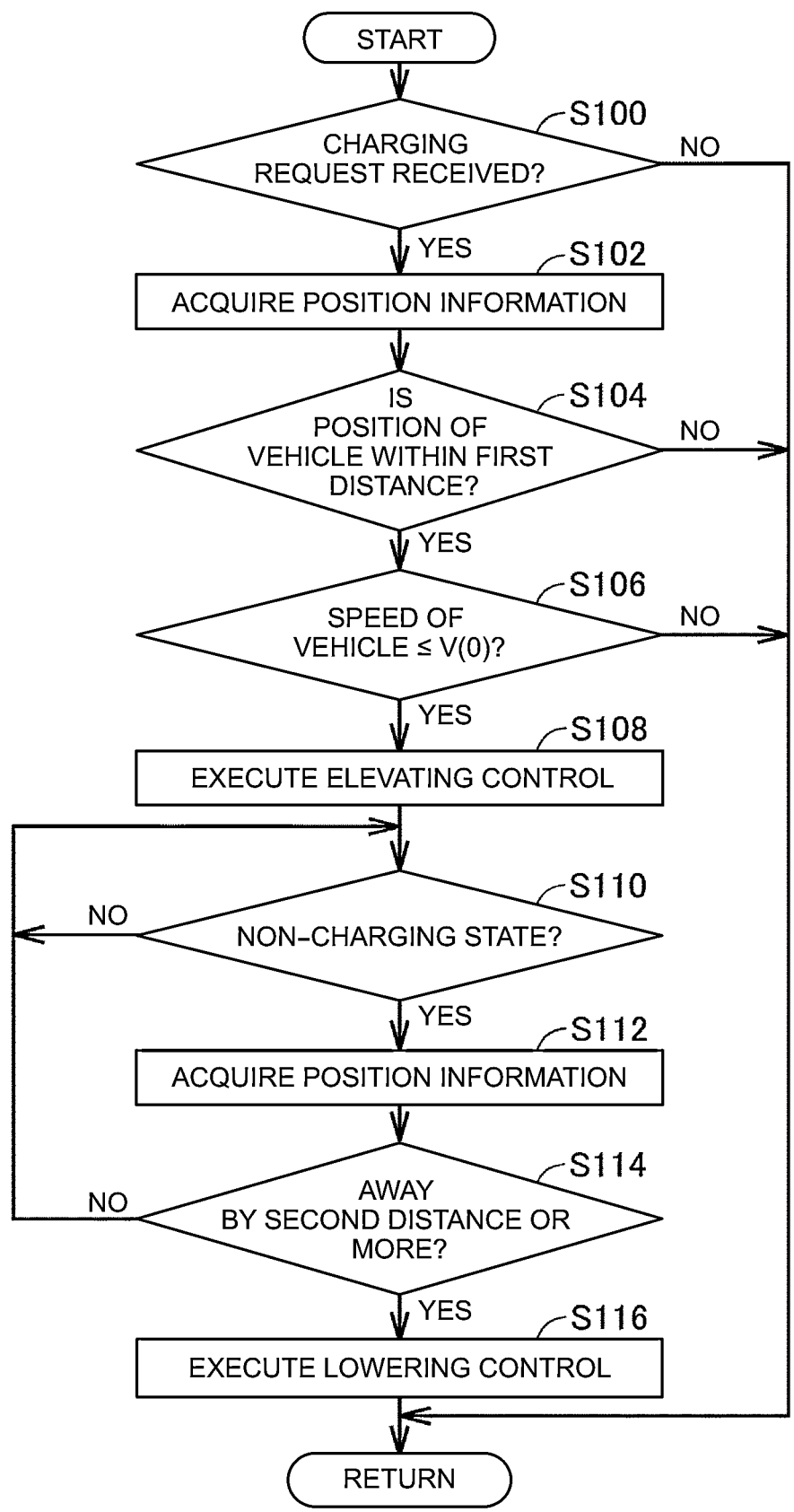
FIG. 5 is a flowchart showing an example of a process executed by a control device of the charging stand.

Hereinafter, an example of a control process executed by the control device 308 will be described with reference to FIG. 5. FIG. 5 is a flowchart showing an example of a process executed by the control device 308 of the charging stand 300. The series of processes shown in this flowchart are repeatedly executed at predetermined control cycles.

In step (hereinafter step will be referred to as S) 100, the control device 308 determines whether the control device 308 has receive the charging request. For example, the control device 308 determines whether the charging request has been received based on a reception flag that is set to an ON state when the charging request is received. For example, the control device 308 determines that the charging request has been received when, for example, the reception flag is in the ON state. The charging request indicates a charging request from the electrified vehicle 200 or the management server 600. The reception flag is set to an OFF state, for example, after the process in S108 that will be described later.

For example, when a destination is set by the user, the ECU 202 of the electrified vehicle 200 performs an operation to specify an available charging stand 300 around the destination. Alternatively, for example, the ECU 202 performs an operation to specify an available charging stand 300 around the electrified vehicle 200 when the user performs a predetermined operation for searching for the available charging stand 300.

The ECU 202 performs the operation to specify the available charging stand 300 by, for example, searching the available charging stand 300 by making an inquiry to the management server 600 for the available charging stand 300 within a predetermined range centered on the destination or the electrified vehicle 200. The ECU 202 specifies the available charging stand 300 closest to the center based on the search results. The ECU 202 transmits the charging request to the specified charging stand 300 after establishing communication with the specified charging stand 300.

Alternatively, for example, when the destination is set by the user, the ECU 202 transmits the position information of the set destination to the management server 600. Alternatively, the ECU 202 transmits the position information of the electrified vehicle 200 to the management server 600 when, for example, the user performs the operation for searching the available charging stand 300.

For example, the management server 600 searches the available charging stand 300 within a predetermined range centered on the destination or the electrified vehicle 200 from a plurality of the charging stands 300 managed by the management server 600. The management server 600 specifies the available charging stand 300 closest to the center based on the search results. The management server 600 transmits the charging request to the specified charging stand 300 after establishing communication with the specified charging stand 300.

When the control device 308 determines that the charging request has been received (YES in S100), the process proceeds to S102.

In S102, the control device 308 acquires the position information of the electrified vehicle 200 to be charged. When the control device 308 receives the charging request from the electrified vehicle 200, for example, the control device 308 requests the position information from the electrified vehicle 200 that is the transmission source. Alternatively, for example, when the control device 308 receives the charging request from the management server 600, the control device 308 requests the position information of the electrified vehicle 200 to be charged from the management server 600 that is the transmission source. When the management server 600 receives a request for the position information from the charging stand 300, the management server 600 requests the position information from the electrified vehicle 200 to be charged.

When the ECU 202 of the electrified vehicle 200 receives the request for the position information, the ECU 202 acquires the position information of the electrified vehicle 200 using the position detection device 206. The ECU 202 transmits the acquired position information to the charging stand 300 that is the request source of the position information. At this time, the position information may be transmitted to the charging stand 300 via the management server 600.

In S104, the control device 308 determines whether the position of the electrified vehicle 200 is within the first distance from the charging stand 300. The control device 308 calculates the distance between the electrified vehicle 200 and the charging stand 300 using the position information. When the calculated distance is equal to or less than the first distance, the control device 308 determines that the position of the electrified vehicle 200 is within the first distance from the charging stand 300. The first distance is, for example, an upper limit of the distance at which the connector 302 of the charging stand 300 can be connected to the inlet 220 of the electrified vehicle 200. When the control device 308 determines that the position of the electrified vehicle 200 is within the first distance from the charging stand 300 (YES in S104), the process proceeds to S106.

In S106, the control device 308 determines whether the speed of the electrified vehicle 200 is equal to or less than a threshold value V(0). The control device 308 calculates the speed of the electrified vehicle 200 using, for example, the position information of the electrified vehicle 200 acquired previously and the acquisition time thereof and the position information of the electrified vehicle 200 acquired currently and the acquisition time thereof, and determines whether the calculated speed is equal to or less than the threshold value V(0). The threshold value V(0) is, for example, a value for determining the stopped state, and is adjusted by an experiment or the like. Note that, the control device 308 may acquire vehicle speed information together with the position information from the electrified vehicle 200 and determine whether the speed of the electrified vehicle 200 is equal to or less than the threshold value V(0) using the acquired vehicle speed information. When the control device 308 determines the speed of the electrified vehicle 200 is equal to or less than the threshold value V(0) (YES in S106), the process proceeds to S108.

In S108, the control device 308 executes the elevating control. The control device 308 controls the elevating device 306 such that the movable portion 300*a* is elevated to a position corresponding to the second state.

In S110, the control device 308 determines whether a non-charging state is established. For example, the control device 308 determines that the non-charging state is established when the connector 302 is not connected to the inlet 220 of the electrified vehicle 200. Whether the connector 302 is connected to the inlet 220 may be determined using, for example, the detection result of a sensor, a switch, or the like provided in the electrified vehicle 200 or the charging stand 300. When the control device 308 determines that the non-charging state is established (YES in S110), the process proceeds to S112.

In S112, the control device 308 acquires the position information of the electrified vehicle 200 to be charged. The method for acquiring the position information of the electrified vehicle 200 is as described above. Therefore, the detailed description thereof will not be repeated. The ECU 202 of the electrified vehicle 200 may transmit the position information to the charging stand 300 after the system is started, for example, when the system is stopped at the time of reception of the request for the position information.

In S114, the control device 308 determines whether the position of the electrified vehicle 200 is away from the charging stand 300 by a second distance or more. The control device 308 calculates the distance between the electrified vehicle 200 and the charging stand 300 using the position information. When the calculated distance is equal to or more than the second distance, the control device 308 determines that the position of the electrified vehicle 200 is away from the charging stand 300 by the second distance or more. The second distance is, for example, a lower limit of the distance at which the connector 302 of the charging stand 300 cannot be connected to the inlet 220 of the electrified vehicle 200. That is, the second distance is a distance longer than the first distance. When the control device 308 determines that the position of the electrified vehicle 200 is away from the charging stand 300 by the second distance or more (YES in S114), the process proceeds to S116.

In S116, the control device 308 executes the lowering control. The control device 308 controls the elevating device 306 such that the movable portion 300*a* is lowered to a position corresponding to the first state.

When the control device 308 determines that the charging request is not received (NO in S100), when the control device 308 determines that the position of the electrified vehicle 200 is not within the first distance from the charging stand 300 (NO in S104), or when the control device 308 determines that the speed of the electrified vehicle 200 is not equal to or less than the threshold value V(0) (NO in S106), this process is terminated. Further, when the control device 308 determines that the non-charging state is not established (NO in S110) or when the control device 308 determines that the position of the electrified vehicle 200 is not away from the charging stand 300 by the second distance or more (NO in S114), the process returns to S110.

Figure 6:
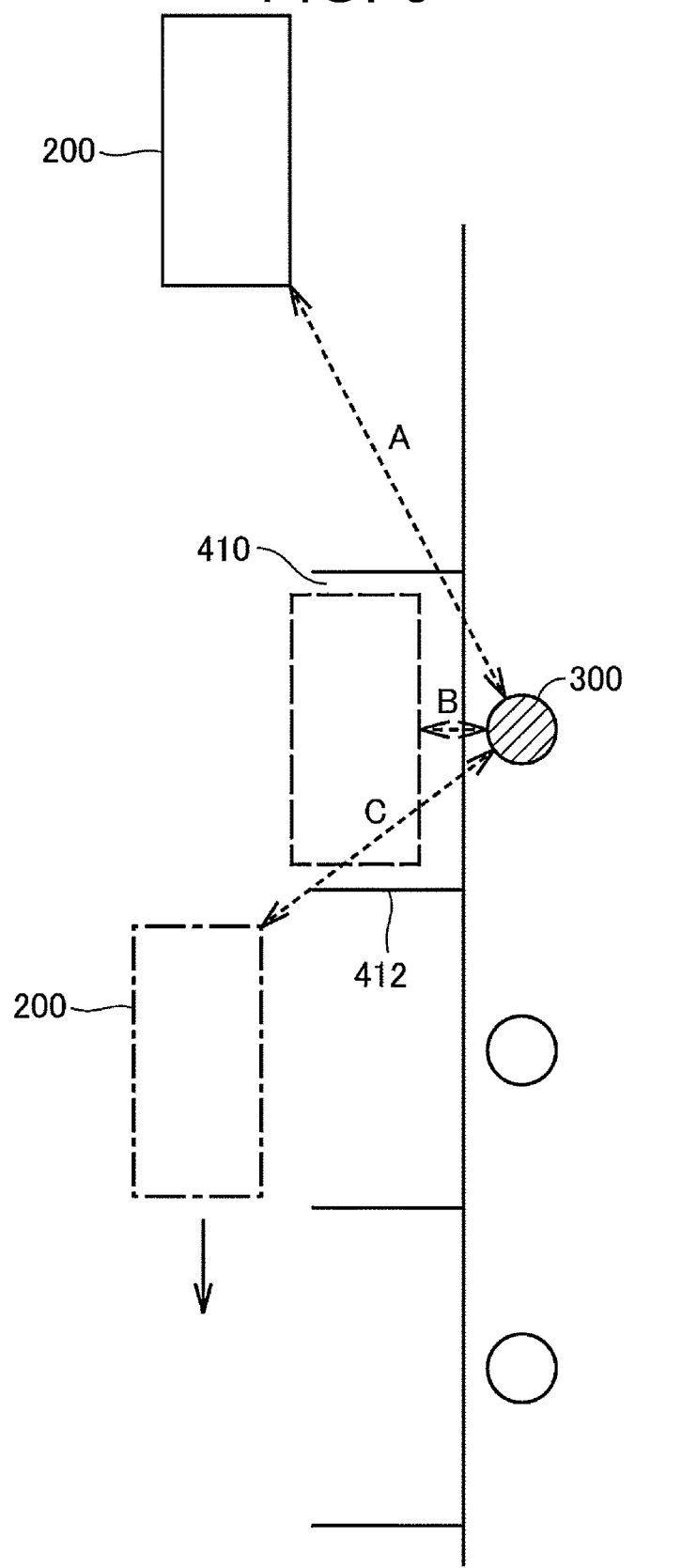
FIG. 6 is a diagram showing a positional relationship between the electrified vehicle and the charging stand to be used.

An example of the operation of the control device 308 of the charging stand 300 that is the charging facility according to the present embodiment based on the above structure and the flowchart will be described with reference to FIG. 6. FIG. 6 is a diagram showing a positional relationship between the electrified vehicle 200 and the charging stand 300 to be used. The circular shaded area in FIG. 6 indicates the charging stand 300 to be used.

For example, it is assumed that the destination is set before the electrified vehicle 200 starts traveling, and the available charging stand 300 is specified around the destination. Further, it is assumed that the charging stand 300 is in the first state.

When the available charging stand 300 is specified, the ECU 202 of the electrified vehicle 200 transmits the charging request after a communication with the specified charging stand 300 is established.

When the charging request from the electrified vehicle 200 to be charged is received (YES in S100), the position information of the electrified vehicle 200 that is the transmission source is acquired (S102). That is, the position information is requested from the electrified vehicle 200 that is the transmission source. The ECU 202 of the electrified vehicle 200 to be charged acquires information related to the position of the electrified vehicle 200 from the position detection device 206 in response to the request for the position information, and transmits the acquired position information to the charging stand 300 to be used. The charging stand 300 acquires the position information from the electrified vehicle 200.

The control device 308 determines whether the position of the electrified vehicle 200 is within the first distance from the charging stand 300 using the acquired position information (S104).

As shown by the solid rectangular frame in FIG. 6, when a distance A between the electrified vehicle 200 and the charging stand 300 is larger than the first distance (NO in S104), the charging stand 300 is kept in the first state. Therefore, until the position of the electrified vehicle 200 to be charged is within the first distance from the charging stand 300, establishment of the second state is suppressed, whereby the landscape of the installation place of the charging stand 300 is suppressed from being spoiled.

On the other hand, as shown by the broken rectangular frame in FIG. 6, a distance B between the electrified vehicle 200 and the charging stand 300 is smaller than the first distance (YES in S104), and the electrified vehicle 200 is in the stopped state in which the speed of the electrified vehicle 200 is equal to or less than the threshold value V(0) (YES in S106), the elevating control is executed (S108). With this process, the elevating device 306 is controlled such that the charging stand 300 to be used is in the second state. Therefore, the charging stand 300 is in the second state without the operation performed by the user of the electrified vehicle 200 to place the charging stand 300 in the second state.

When the user connects the connector 302 of the charging stand 300 to the inlet 220 of the electrified vehicle 200, charging of the battery 214 mounted on the electrified vehicle 200 is started. At this time, the connector 302 is connected to the inlet 220. Therefore, the control device 308 determines that the charging state is established (NO in S110). When the battery 214 is fully charged, for example, the user disconnects the connector 302 and stores the connector 302 in the movable portion 300a. At this time, the control device 308 determines that the non-charging state is established (YES in S110), the position information of the electrified vehicle 200 is acquired (S112).

When the user activates the system of the electrified vehicle 200 to drive the electrified vehicle 200, the position information is transmitted to the charging stand 300. When the position of the electrified vehicle 200 is not away from the charging stand 300 by the second distance or more (NO in S114), the charging stand 300 is kept in the first state.

On the other hand, when the operation of the electrified vehicle 200 is started and a distance C between the electrified vehicle 200 and the charging stand 300 is equal to or more than the second distance as shown in the rectangular frame of the alternate long and short dash line in FIG. 6, (YES in S114), the lowering control is executed (S116). With this process, the elevating device 306 is controlled such that the movable portion 300a of the charging stand 300 to be used is in the first state. Therefore, the charging stand 300 is in the first state without the operation performed by the user of the electrified vehicle 200 to place the charging stand 300 in the first state.

As described above, with the charging stand 300 that is the charging facility according to the present embodiment, the movable portion 300a can be elevated without the operation performed by the user to elevate the movable portion 300a when the position of the electrified vehicle 200 that is the target vehicle is within the first distance from the charging stand 300, and the electrified vehicle 200 is in the stopped state. Further, it is possible to suppress elevation of the movable portion 300a until the electrified vehicle 200 is in the stopped state at the position within the first distance from the charging stand 300. Therefore, it is possible to suppress deterioration of the convenience of the charging stand 300 while suppressing the landscape of the place where the charging stand 300 is installed from being spoiled. Therefore, it is possible to provide a charging facility that suppresses deterioration of convenience without spoiling the landscape of the installation place.

Further, after the movable portion 300a is elevated, the movable portion 300a can be lowered without the operation performed by the user to lower the movable portion 300a after the charging stand 300 is used, or when the electrified vehicle 200 is away from the charging stand 300 by the second distance or more without using the charging stand 300.

Hereinafter, modifications will be described.
In the above-described embodiment, the power source 350 has been described as an AC power supply. However, the power source 350 may be a DC power supply. In this case, the electrified vehicle 200 may have a configuration in which the charger 212 is omitted, for example.

Further, in the above-described embodiment, the case where the housing of the charging stand 300 has a cylindrical shape has been described as an example. However, the shape of the housing is not particularly limited to the cylindrical shape, as long as the shape of the housing has a shape that allows elevating and lowering movements. For example, the housing of the charging stand 300 may have a rectangular shape.

Further, in the above-described embodiment, it has been described that the elevating control is executed when the position of the electrified vehicle 200 is within the first distance and the speed of the electrified vehicle 200 is equal to or less than the threshold value V(0) indicating the stopped state. However, in addition to the case where the position of the electrified vehicle 200 is within the first distance and the speed of the electrified vehicle 200 is equal to or less than the threshold value V(0), the elevating control may be executed when the state of charge (SOC) of the battery 214 mounted on the electrified vehicle 200 is smaller than a threshold value. With this configuration, when the electrified vehicle 200 of which battery 214 is exhausted is in the stopped state at the position within the first distance from the charging stand 300, charging using the charging stand 300 can be started promptly. Note that, for example, the ECU 202 of the electrified vehicle 200 detects a temperature, current, and voltage of the battery 214 using a sensor or the like, and estimates the SOC using the detection result.

Further, in the above-described embodiment, it has been described that the elevating control is executed when the position of the electrified vehicle 200 is within the first distance and the speed of the electrified vehicle 200 is equal to or less than the threshold value V(0) indicating the stopped state. However, the elevating control may be executed when the position of the electrified vehicle 200 is within the first distance and the speed of the electrified vehicle 200 is equal to or less than a threshold value V(1) indicating the slow-moving state, in place of the threshold value V(0) indicating the stopped state. The threshold value V(1) is a predetermined value for determining that the electrified vehicle 200 is in the slow-moving state, and is adjusted by an experiment or the like. With this configuration, the movable portion 300a can be elevated before the time when the electrified vehicle 200 is in the stopped state. Therefore, charging using the charging stand 300 can be started promptly.

Further, in the above-described embodiment, it has been described that the elevating control is executed such that the charging stand 300 is in the second state when the position of the electrified vehicle 200 is within the first distance and the speed of the electrified vehicle 200 is equal to or less than the threshold value V(0) indicating the stopped state. However, in addition to execution of the elevating control, lighting by a lighting device provided at the upper end of the movable portion 300a and generation of sound and voice from a speaker may also be performed. With this configuration, the user of the electrified vehicle 200 to be charged can recognize the operation of the charging stand 300 to be used.

Further, in the above-described embodiment, it has been described that the position information of the electrified vehicle 200 to be charged is received from the electrified vehicle 200 or the management server 600. However, for example, the control device 308 of the charging stand 300 may receive the position information of the electrified vehicle 200 to be charged from the mobile terminal possessed by the user. For example, the mobile terminal may transmit the position information acquired from the electrified vehicle 200 to the charging stand 300 or the management server 600.

Further, in the above-described embodiment, it has been described that the upper limit of the distance that the connector 302 can be connected to the inlet 220 of the electrified vehicle 200 to be charged is set as the first distance. However, a shorter distance than the upper limit may be set as the first distance, or a longer distance than the upper limit may be set as the first distance. For example, when a distance shorter than the upper limit is set as the first distance, the elevating control is executed when the electrified vehicle 200 is parked in the parking space corresponding to the charging stand 300 and the electrified vehicle 200 moves slowly near the parking space. Therefore, the movable portion 300a can be suppressed from being in the second state for a long period of time. Therefore, it is possible to suppress the landscape of the place where the charging stand is installed from being spoiled. Further, for example, in the case where a distance longer than the upper limit value is set as the first distance, the elevating control is executed when, for example, the electrified vehicle 200 to be charged is in the stopped state or in the slow-moving state to search for the position of the charging stand 300. Therefore, the user of the electrified vehicle 200 can easily find the charging stand 300 to be used.

Further, in the above-described embodiment, it has been described that the first distance is set to a predetermined value. However, the first distance may be set using the usage status of the charging stand 300, for example.

Figure 7:
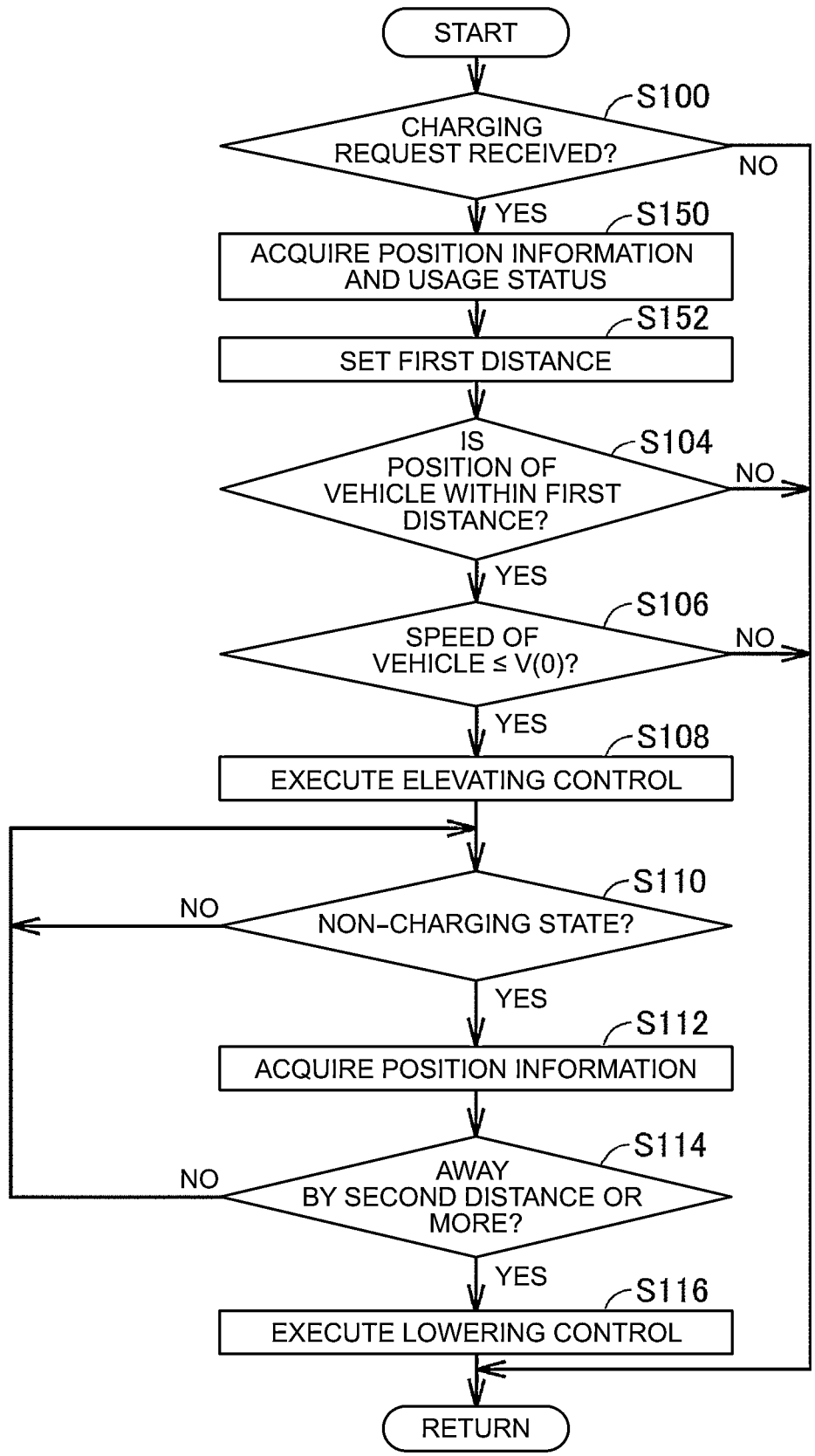
FIG. 7 is a flowchart showing an example of a process executed by a control device of a charging stand in a modification.

Hereinafter, an example of a control process executed by the control device 308 of the charging stand 300 in a modification will be described with reference to FIG. 7. FIG. 7 is a flowchart showing an example of a process executed by the control device 308 of the charging stand 300 in the modification. The series of processes shown in this flowchart are repeatedly executed at predetermined control cycles.

The flowchart in FIG. 7 is different in that S150 and S152 are included in place of S102 in the flowchart in FIG. 5. The processes in S100, S104, S106, S108, S110, S112, S114, and S116 in the flowchart in FIG. 7 are the same processes as compared with the processes in S100, S104, S106, S108, S110, S112, S114, and S116 in the flowchart in FIG. 5, except for the contents explained below. Therefore, the detailed description of the same process contents will not be repeated.

When the control device 308 determines in S100 that the charging request has been received (YES in S100), the process proceeds to S150.

In S150, the control device 308 acquires the position information and the usage status. The method for acquiring the position information is the same as the method for acquiring the position information in the process of S102 in FIG. 5 described above. Therefore, the detailed description thereof will not be repeated. The usage status is the number of times of use, and may be, for example, the number of times of charging at the charging stand 300, the number of times of elevating and lowering of the charging stand 300, or the number of receptions of usage reservations, during the latest predetermined period. Alternatively, the usage status may be, for example, the total number of times of charging at the charging stand 300, the total number of times of elevating and lowering of the charging stand 300, or the total number of receptions of usage reservations.

In S152, the control device 308 sets the first distance. The control device 308 sets the first distance using the acquired usage status. For example, when the number of times of use exceeds a threshold value, the control device 308 sets a shorter distance than the distance when the number of times of use is equal to or less than the threshold value. That is, when the number of times of use is equal to or less than the threshold value, the control device 308 sets a longer distance than the distance when the number of times of use exceeds the threshold value.

Figure 8:
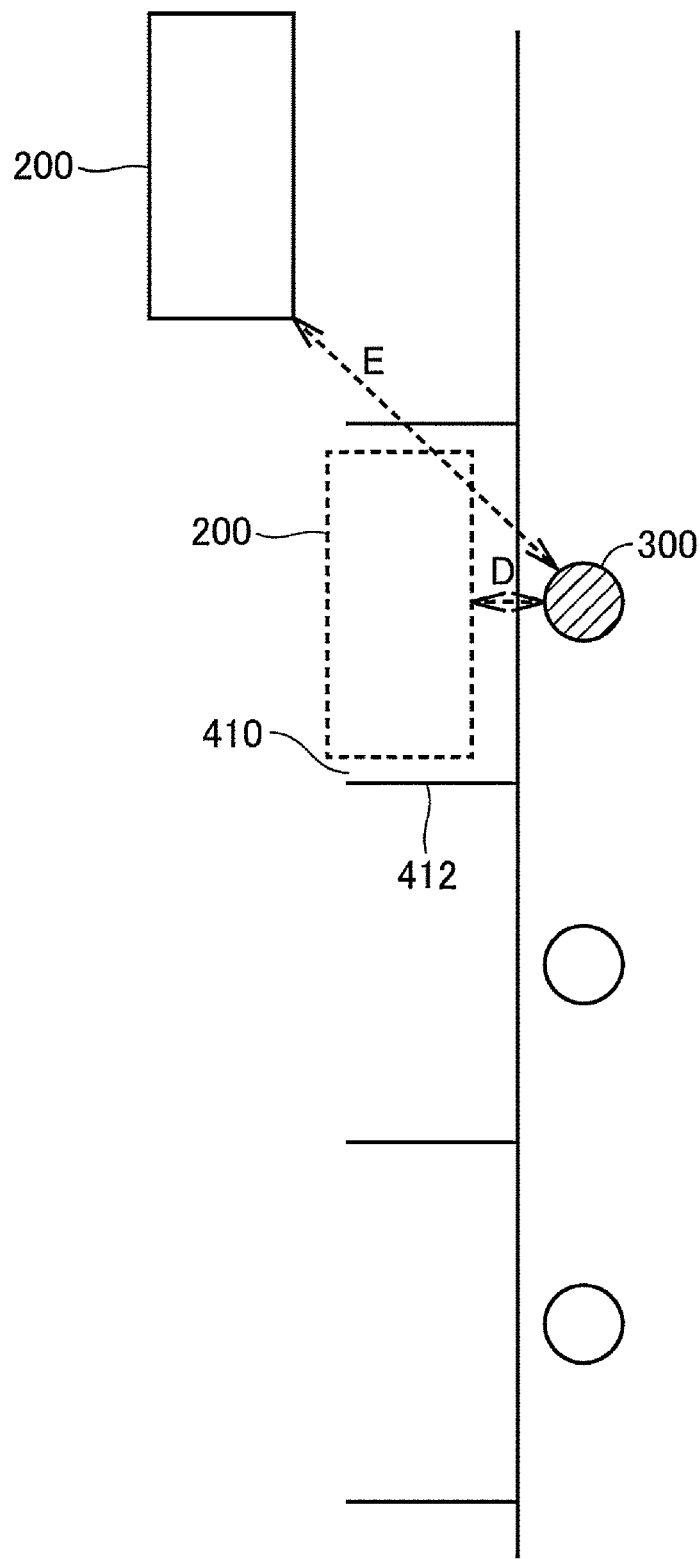
FIG. 8 is a diagram for explaining the operation of the control device of the charging stand in the modification.

The operation of the control device 308 in this modification based on the flowchart shown in FIG. 7 will be described with reference to FIG. 8. FIG. 8 is a diagram for explaining the operation of the control device 308 of the charging stand 300 in the modification.

When the charging request from the electrified vehicle 200 to be charged is received (YES in S100), the position information of the electrified vehicle 200 that is the transmission source and the usage status of the charging stand 300 are acquired (S150). The first distance is set using the acquired usage status (S152).

Then, the control device 308 determines whether the position of the electrified vehicle 200 is within the first distance from the charging stand 300 using the acquired position information (S104). When the position of the electrified vehicle 200 is away from the charging stand 300 by the first distance or more (NO in S104), the charging stand 300 is kept in the first state. On the other hand, when the position of the electrified vehicle 200 is within the first distance (YES in S104) and the electrified vehicle 200 is stopped (YES in S106), the elevating control is executed (S108).

The first distance is set to be long when the number of times of use is small. Therefore, for example, as shown in the solid rectangular frame in FIG. 8, in the case where the distance between the electrified vehicle 200 to be charged and the charging stand 300 is a distance E and is equal to or less than the first distance, the elevating control is executed when the speed of the electrified vehicle 200 is equal to or less than the threshold value indicating the stopped state or the slow-moving state. When the number of times of use is small, the period of the second state is shorter than that of the case where the number of times of use is large, whereby charging can be started promptly while suppressing the landscape of the installation place from being spoiled.

The first distance is set to be shorter when the number of times of use is large. Therefore, for example, as shown in the broken rectangular frame in FIG. 8, in the case where the distance between the electrified vehicle 200 to be charged and the charging stand 300 is a distance D and is equal to or less than the first distance, the elevating control is executed when the speed of the electrified vehicle 200 is equal to or less than the threshold value indicating the stopped state or the slow-moving state. When the number of times of use is large, the period of the second state is longer than that of the case where the number of times of use is small, whereby the elevation of the movable portion 300a can be suppressed until the target vehicle approaches to the nearest position. Therefore, it is possible to suppress the period of the second state from becoming redundant and to suppress the landscape of the installation place from being spoiled.

In the above-mentioned modification, it has been described that the first distance is set using the usage status. However, the first distance may be set using information on the area including the installation point in place of or in addition to the usage status. The information of the area including the installation point includes information on the use area such as a residential area or a commercial area.

For example, the control device 308 may set the first distance to be shorter when the area including the installation place is a commercial area and the traffic volume of pedestrians and vehicles is large, compared to the case where the traffic volume is small. Alternatively, the control device 308 may set the first distance to be shorter when, for example, the area including the installation place is a commercial area and the time slot is a time slot in which the traffic volume of pedestrians and vehicles is large (for example, the time slot of commuting rush hours such as morning and evening), compared to the case where the traffic volume is small (for example, the time slot other than the time slot of commuting rush hours). Alternatively, the control device 308 may set the first distance to be shorter when the area including the installation place is a commercial area than that when the area including the installation place is a residential area.

With this configuration, in a situation where few people see the landscape including the charging stand 300 where the traffic volume is small, the first time is set to be long. Therefore, charging can be started promptly while suppressing the landscape from being spoiled.

On the other hand, in a situation where many people see the landscape including the charging stand 300 where the traffic volume is large, the first time is set to be short. Therefore, it is possible to suppress the elevation of the movable portion 300a until the target vehicle approaches to the nearest position. Therefore, it is possible to suppress the period of the second state from becoming redundant and to suppress the landscape of the installation place from being spoiled.

Further, in the above-described embodiment, it has been described that the control device 308 of the charging stand 300 determines whether the position of the electrified vehicle 200 is within the first distance and the electrified vehicle 200 is stopped. However, the management server 600 may be used instead of the control device 308 for making the determination.

Hereinafter, an example of a control process executed by the management server 600 in a modification will be described with reference to FIG. 9. FIG. 9 is a flowchart showing an example of a process executed by the management server 600 in the modification. The series of processes shown in this flowchart are repeatedly executed at predetermined control cycles.

In S200, the management server 600 determines whether the charging request has been received. For example, the management server 600 determines whether the charging request has been received based on a reception flag that is set to an ON state when the charging request is received. For example, the management server 600 determines that the charging request has been received when, for example, the reception flag is in the ON state. The charging request indicates a charging request from the electrified vehicle 200. The reception flag is set to an OFF state, for example, after the process in S212 that will be described later.

For example, when the destination is set by the user, the ECU 202 of the electrified vehicle 200 transmits the charging request to the management server 600 together with the position information of the destination. Alternatively, the ECU 202 transmits the charging request to the management server 600 together with the position information of the electrified vehicle 200 when the user performs a predetermined operation for requesting charging. The management server 600 sets the reception flag to the ON state when receiving the charging request.

When the management server 600 determines that the charging request has been received (YES in S200), the process proceeds to S202.

In S202, the management server 600 identifies the available charging stand 300. For example, the management server 600 searches the available charging stand 300 within a predetermined range centered on the destination or the electrified vehicle 200 from among a plurality of the charging stands 300 managed by the management server 600. For example, the management server 600 specifies the available charging stand 300 closest to the center based on the search results.

In S204, the management server 600 transmits the position information of the specified charging stand 300 to the electrified vehicle 200. For example, the ECU 202 of the electrified vehicle 200 may set the specified charging stand 300 as the destination in the navigation system using the position information of the specified charging stand 300. The position information of the specified charging stand 300 may be stored in the storage device of the management server 600 in advance, or may be acquired from the specified charging stand 300.

In S206, the management server 600 acquires the position information of the electrified vehicle 200 to be charged. The management server 600 requests the position information from the electrified vehicle 200 that is the transmission source of the charging request, for example.

When the ECU 202 of the electrified vehicle 200 receives the request for the position information from the management server 600, the ECU 202 acquires the position information of the electrified vehicle 200 using the position detection device 206 and transmits the acquired position information to the management server 600.

In S208, the management server 600 determines whether the position of the electrified vehicle 200 is within the first distance from the charging stand 300. The determination method and the first distance are as described above. Therefore, the detailed description thereof will not be repeated. When the management server 600 determines that the position of the electrified vehicle 200 is within the first distance from the charging stand 300 (YES in S208), the process proceeds to S210.

In S210, the management server 600 determines whether the speed of the electrified vehicle 200 is equal to or less than the threshold value V(0). The management server 600 calculates the speed of the electrified vehicle 200 using, for example, the position information of the electrified vehicle 200 acquired previously and the acquisition time thereof and the position information of the electrified vehicle 200 acquired currently and the acquisition time thereof, and determines whether the calculated speed is equal to or less than the threshold value V(0). The threshold value V(0) is as described above. Therefore, the detailed description thereof will not be repeated. Note that, the management server 600 may acquire vehicle speed information together with the position information from the electrified vehicle 200 and determine whether the speed of the electrified vehicle 200 is equal to or less than the threshold value V(0) using the acquired vehicle speed information. When the management server 600 determines that the speed of the electrified vehicle 200 is equal to or less than the threshold value V(0) (YES in S210), the process proceeds to S212.

In S212, the management server 600 requests the movable portion 300a of the charging stand 300 to be elevated. The management server 600 transmits information indicating the elevating request to the charging stand 300. The charging stand 300 executes the elevating control in response to the elevating request from the management server 600. At this time, the control device 308 controls the elevating device 306 such that the movable portion 300a is elevated to a position corresponding to the second state.

In S214, the management server 600 determines whether the non-charging state is established. For example, the management server 600 acquires information indicating whether the connector 302 of the charging stand 300 is connected to the inlet 220 of the electrified vehicle 200. The method for determining whether the connector 302 and the inlet 220 are connected is as described above. Therefore, the detailed description thereof will not be repeated. The management server 600 determines that the non-charging state is established when the acquired information includes information indicating that the connector 302 is not connected to the inlet 220. When the management server 600 determines that the non-charging state is established (YES in S214), the process proceeds to S216.

In S216, the management server 600 acquires the position information of the electrified vehicle 200 to be charged. The method for acquiring the position information of the electrified vehicle 200 by the management server 600 is as described above. Therefore, the detailed description thereof will not be repeated. The ECU 202 of the electrified vehicle 200 may transmit the position information to the management server 600 after the system is started, for example, when the system is stopped at the time of reception of the request for the position information.

In S218, the management server 600 determines whether the position of the electrified vehicle 200 is away from the charging stand 300 by the second distance or more. The second distance is as described above. Therefore, the detailed description thereof will not be repeated. When the management server 600 determines that the position of the electrified vehicle 200 is away from the charging stand 300 by the second distance or more (YES in S218), the process proceeds to S220.

In S220, the management server 600 requests the movable portion 300a of the charging stand 300 to be lowered. The management server 600 transmits information indicating the lowering request to the charging stand 300. The charging stand 300 executes the lowering control in response to the lowering request from the management server 600. At this time, the control device 308 controls the elevating device 306 such that the movable portion 300a is lowered to a position corresponding to the first state.

Note that, when the management server 600 determines that the charging request has not been received (NO in S200), this process is terminated. On the other hand, when the management server 600 determines that the position of the electrified vehicle 200 is not within the first distance (NO in S208), or when the management server 600 determines that the speed of the electrified vehicle 200 is not equal to or less than the threshold value V(0) (NO in S210), the process returns to S206. Further, when the management server 600 determines that the non-charging state is not established (NO in S214) or when the management server 600 determines that the position of the electrified vehicle 200 is not away from the charging stand 300 by the second distance or more (NO in S218), the process returns to S214.

An example of the operation of the management server 600 that is the management device of the charging stand 300 in the modification based on the above flowchart will be described.

For example, it is assumed that the destination is set before the electrified vehicle 200 starts traveling, and the charging request is transmitted to the management server 600 together with the position information of the destination.

When the charging request from the electrified vehicle 200 to be charged is received (YES in S200), the available charging stand 300 around the destination is specified (S202), and the position information of the specified charging stand is transmitted to the electrified vehicle 200 (S204).

The ECU 202 of the electrified vehicle 200 to be charged acquires the information related to the position of the electrified vehicle 200 from the position detection device 206 in response to the request for the position information, and transmits the acquired position information to the management server 600.

When the management server 600 acquires the position information (S206), the management server 600 determines whether the position of the electrified vehicle 200 is within the first distance from the charging stand 300 using the acquired information (S208).

For example, when the position of the electrified vehicle 200 is away from the charging stand 300 in excess of the first distance (NO in S208), the charging stand 300 is kept in the first state. Therefore, until the position of the electrified vehicle 200 to be charged is within the first distance from the charging stand 300, establishment of the second state is suppressed, whereby the landscape of the installation place of the charging stand 300 is suppressed from being spoiled.

On the other hand, when the position of the electrified vehicle 200 is within the first distance from the charging stand 300 (YES in S208), and the electrified vehicle 200 is in the stopped state in which the speed of the electrified vehicle 200 is equal to or less than the threshold value V(0) (YES in S210), the management server 600 requests the charging stand 300 to elevate the movable portion 300a (S212). With this process, the elevating device 306 is controlled such that the charging stand 300 to be used is in the second state. Therefore, the charging stand 300 is in the second state without the operation performed by the user of the electrified vehicle 200 to place the charging stand 300 in the second state.

When the user connects the connector 302 of the charging stand 300 to the inlet 220 of the electrified vehicle 200, charging of the battery 214 mounted on the electrified vehicle 200 is started. At this time, the connector 302 is connected to the inlet 220. Therefore, the control device 308 determines that the charging state is established (NO in S214). When the battery 214 is fully charged, for example, the user disconnects the connector 302 and stores the connector 302 in the movable portion 300a. At this time, the control device 308 determines that the non-charging state is established (YES in S214), the position information of the electrified vehicle 200 is acquired (S216).

When the user activates the system of the electrified vehicle 200 to drive the electrified vehicle 200, the position information is transmitted to the charging stand 300. When the position of the electrified vehicle 200 is not away from the charging stand 300 by the second distance or more (NO in S218), the charging stand 300 is kept in the first state.

On the other hand, when driving of the electrified vehicle 200 is started and the position of the electrified vehicle 200 is away from the charging stand 300 by the second distance or more (YES in S218), the management server 600 requests the charging stand 300 to lower the movable portion 300a (S220). With this process, the elevating device 306 is controlled such that the movable portion 300a of the charging stand 300 to be used is in the first state. Therefore, the charging stand 300 is in the first state without the operation performed by the user of the electrified vehicle 200 to place the charging stand 300 in the first state.

Even with this configuration, the movable portion 300a can be elevated without the operation performed by the user to elevate the movable portion 300a because the elevation of the movable portion 300a is requested when the position of the electrified vehicle 200 that is the target vehicle is within the first distance from the charging stand 300, and the electrified vehicle 200 is in the stopped state. Further, it is possible to suppress elevation of the movable portion 300a until the electrified vehicle 200 is in the stopped state at the position within the first distance from the charging stand 300. Therefore, it is possible to suppress deterioration of the convenience of the charging stand 300 while suppressing the landscape of the place where the charging stand 300 is installed from being spoiled. Therefore, it is possible to provide the management device of the charging facility that suppresses deterioration of convenience without spoiling the landscape.

Further, in the above-described embodiment, the case where the reservation for using the charging stand 300 to be used for charging the electrified vehicle 200 to be charged is made has been described as an example. However, the electrified vehicle 200 to be charged is not limited to the electrified vehicle 200 for which the reservation for use is made in advance. The electrified vehicle 200 to be charged may be an electrified vehicle for which the reservation for use is not made in advance and in which the SOC of the battery 214 mounted thereon is smaller than a threshold value. For example, the charging stand 300 is configured to be communicable with the electrified vehicle traveling around, and acquires the position information of the electrified vehicle capable of communicating and the information of the SOC of the battery 214 mounted thereon. The control device 308 of the charging stand 300 may execute the elevating control when the electrified vehicle is within the first distance and in the stopped state or in the slow-moving state, and the SOC is smaller than the threshold value.

Further, in the above-described embodiment, it has been described that the elevating control is executed such that the charging stand 300 is in the second state when the position of the electrified vehicle 200 is within the first distance and the speed of the electrified vehicle 200 is equal to or less than the threshold value V(0) indicating the stopped state. However, the movable portion 300a may be elevated to a position higher than at least the position in the first state.

In addition, the above-mentioned modifications may be carried out by appropriately combining all or a part thereof. The embodiment disclosed herein should be considered to be exemplary and not restrictive in all respects. The scope of the present disclosure is shown by the scope of claims rather than the description above, and is intended to include all modifications within the meaning and the scope equivalent to the scope of claims.

What is claimed is:

1. A movable charging facility that is installed in a recess provided on a ground and configured to charge a power storage device mounted on a vehicle, the movable charging facility comprising:
   a movable portion including a connecting device configured to connect to the power storage device;
   an elevating device configured to elevate or lower the movable portion to establish a plurality of states, the plurality of states including a first state in which the movable portion is stored underground, and a second state in which the movable portion is exposed on the ground;
   a communication device configured to communicate with an external device of the movable charging facility and the vehicle;
   a connector configured to connect to an inlet of the vehicle when charging the power storage device mounted on the vehicle;
   a power source;
   a charging cable connecting the connector and the power source; and
   a control device configured to
      control the elevating device using information received via the communication device, wherein the control device is configured to
- acquire a position of the vehicle to be charged using the communication device,
- in response to (i) the acquired position being within a first distance from the charging facility and (ii) a speed of the vehicle being equal to or less than a threshold value indicating a stopped state or a slow-moving state of the vehicle, control the elevating device to elevate the movable portion, and
- in response to the acquired position being away from the charging facility by a second distance or more after the elevating device elevating the movable portion, control the elevating device to lower the movable portion, the first distance is an upper limit of a distance at which the connector is connectable to the inlet of the vehicle, and the second distance, longer than the first distance, is a lower limit of a distance at which the connector is not connectable to the inlet of the vehicle.

2. The charging facility according to claim 1, wherein the control device is configured to set the first distance using at least one of a usage status of the movable charging facility and information on an area including an installation point of the movable charging facility.

3. The charging facility according to claim 1, wherein the control device is configured to
- acquire a state of charge of the power storage device mounted on the vehicle,
- determine whether the state of charge is below a threshold, and
- in response to the state of charge being below the threshold, control the elevating device to elevate the movable portion.

4. The charging facility according to claim 2, wherein the control device is configured to
- acquire a number of times of elevating and lowering the movable portion,
- determine whether the number of times of elevating and lowering the movable portion is above a threshold, and
- in response to the number of times of elevating and lowering the movable portion being above the threshold, set the first distance to be shorter than when the number of times of elevating and lowering is equal to or less than the threshold.

5. The charging facility according to claim 2, wherein the control device is configured to, in response to a traffic volume of pedestrians and vehicles in vicinity of the charging facility being larger than a predetermined value, set the first distance to be shorter.

6. The charging facility according to claim 2, wherein the control device is configured to
- acquire a number of times of elevating and lowering the movable portion,
- determine whether the number of times of elevating and lowering the movable portion is above a threshold,
- in response to the number of times of elevating and lowering the movable portion being above the threshold, set the first distance to be shorter than a length of the charging cable, and
- in response to the number of times of elevating and lowering the movable portion being equal to or below the threshold, set the first distance to be equal to the length of the charging cable.

7. The charging facility according to claim 5, wherein the control device is configured to
- acquire a number of times of elevating and lowering the movable portion,
- determine whether the number of times of elevating and lowering the movable portion is above a threshold,
- in response to the number of times of elevating and lowering the movable portion being above the threshold, set the first distance to be shorter than a length of the charging cable, and
- in response to the number of times of elevating and lowering the movable portion being equal to or below the threshold, set the first distance to be equal to the length of the charging cable.

8. A management device for managing an operation of a plurality of movable charging facilities, the plurality of movable charging facilities being installed in respective recesses provided on a ground and configured to charge a power storage device mounted on a vehicle, wherein:
- each of the plurality of movable charging facilities includes
  - a movable portion including a connecting device configured to connect to the power storage device,
  - an elevating device configured to elevate or lower the movable portion to establish a plurality of states, the plurality of states including a first state in which the movable portion is stored underground, and a second state in which the movable portion is exposed on the ground,
  - a communication device configured to communicate with the management device,
  - a connector configured to connect to an inlet of the vehicle when charging the power storage device mounted on the vehicle,
  - a power source,
  - a charging cable connecting the connector and the power source, and
  - a control device configured to control the elevating device using information received via the communication device; and
- the management device is configured to
  - acquire a position of the vehicle to be charged by a target charging facility of the plurality of movable charging facilities,
  - in response to (i) the acquired position being within a first distance from the target charging facility and (ii) a speed of the vehicle being equal to or less than a threshold value indicating a stopped state or a slow-moving state of the vehicle, request the target charging facility to elevate the movable portion, and
  - in response to the acquired position being away from the target charging facility by a second distance or more after the elevating device elevating the movable portion, request the target charging facility to lower the movable portion,
- the first distance is an upper limit of a distance at which the connector is connectable to the inlet of the vehicle, and
- the second distance, longer than the first distance, is a lower limit of a distance at which the connector is not connectable to the inlet of the vehicle.

9. The management device of the charging facility according to claim 8, wherein
the management device is configured to set the first distance using at least one of a usage status of the target charging facility and information on an area including an installation point of the target charging facility.

10. The management device of the charging facility according to claim 8, wherein the management device is configured to acquire a state of charge of the power storage device mounted on the vehicle, determine whether the state of charge is below a threshold, and in response to the state of charge being below the threshold, control the elevating device of the target charging facility to elevate the movable portion.

11. The management device of the charging facility according to claim 9, wherein the management device is configured to acquire a number of times of elevating and lowering the movable portion, determine whether the number of times of elevating and lowering the movable portion is above a threshold, and in response to the number of times of elevating and lowering the movable portion being above the threshold, set the first distance to be shorter than when the number of times of elevating and lowering is equal to or less than the threshold.

12. The management device of the charging facility according to claim 9, wherein the management device is configured to, in response to a traffic volume of pedestrians and vehicles in vicinity of the charging facility being larger than a predetermined value, set the first distance to be shorter.

13. The management device of the charging facility according to claim 9, wherein the management device is configured to acquire a number of times of elevating and lowering the movable portion, determine whether the number of times of elevating and lowering the movable portion is above a threshold, in response to the number of times of elevating and lowering the movable portion being above the threshold, set the first distance to be shorter than a length of the charging cable, and in response to the number of times of elevating and lowering the movable portion being equal to or below the threshold, set the first distance to be equal to the length of the charging cable.

14. The management device of the charging facility according to claim 12, wherein the management device is configured to acquire a number of times of elevating and lowering the movable portion, determine whether the number of times of elevating and lowering the movable portion is above a threshold, in response to the number of times of elevating and lowering the movable portion being above the threshold, set the first distance to be shorter than a length of the charging cable, and in response to the number of times of elevating and lowering the movable portion being equal to or below the threshold, set the first distance to be equal to the length of the charging cable.

\* \* \* \* \*